United States Patent
Kim et al.

(10) Patent No.: US 9,661,559 B2
(45) Date of Patent: May 23, 2017

(54) METHOD AND APPARATUS FOR SELECTING WIRELESS ACCESS USING APPLICATION IDENTIFICATION INFORMATION IN WIRELESS COMMUNICATION SYSTEM

(71) Applicant: LG ELECTRONICS INC., Seoul (KR)

(72) Inventors: Jaehyun Kim, Anyang-si (KR); Laeyoung Kim, Anyang-si (KR); Taehyeon Kim, Anyang-si (KR); Hyunsook Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 158 days.

(21) Appl. No.: 14/385,341

(22) PCT Filed: Mar. 19, 2013

(86) PCT No.: PCT/KR2013/002226
§ 371 (c)(1),
(2) Date: Sep. 15, 2014

(87) PCT Pub. No.: WO2013/141560
PCT Pub. Date: Sep. 26, 2013

(65) Prior Publication Data
US 2015/0036672 A1  Feb. 5, 2015

Related U.S. Application Data

(60) Provisional application No. 61/612,400, filed on Mar. 19, 2012, provisional application No. 61/620,445, (Continued)

(51) Int. Cl.
*H04W 4/00* (2009.01)
*H04W 48/16* (2009.01)
(Continued)

(52) U.S. Cl.
CPC ........... *H04W 48/16* (2013.01); *H04W 40/02* (2013.01); *H04W 48/18* (2013.01); *H04L 67/303* (2013.01)

(58) Field of Classification Search
CPC ..... H04W 48/16; H04W 48/18; H04W 40/02; H04L 67/303
See application file for complete search history.

(56) References Cited

U.S. PATENT DOCUMENTS

| 2007/0288543 A1* | 12/2007 | Evans | H04M 1/72563 709/200 |
| 2013/0012182 A1* | 1/2013 | Liao | H04W 48/20 455/418 |
| 2013/0210385 A1* | 8/2013 | Ahmed | H04W 12/06 455/411 |

FOREIGN PATENT DOCUMENTS

KR  10-2010-0040671  4/2010

OTHER PUBLICATIONS

Huawei, et al., "Aspects of use of application IDs for DIDA," SA WG2 Meeting #88, S2-115123, Nov. 2011, 6 pages.*
(Continued)

*Primary Examiner* — Jutai Kao
(74) *Attorney, Agent, or Firm* — Lee Hong Degerman Kang Waimey

(57) ABSTRACT

The present invention relates to a wireless communication system and, more specifically, to a method and an apparatus for processing a non-access stratum (NAS) signaling request. According to one embodiment of the present invention, the method for enabling a terminal to perform the NAS signaling process in a wireless communication system comprises the steps of: receiving a first message comprising information for indicating network failure from a network node of a first network; starting a timer related to network selection; and selecting a second network among the net-
(Continued)

work candidates except for the first network when the timer related to network selection is operated.

12 Claims, 5 Drawing Sheets

Related U.S. Application Data filed on Apr. 5, 2012, provisional application No. 61/623,073, filed on Apr. 12, 2012, provisional application No. 61/754,648, filed on Jan. 21, 2013.

(51) Int. Cl.
*H04W 40/02* (2009.01)
*H04W 48/18* (2009.01)
*H04L 29/08* (2006.01)

(56) References Cited

OTHER PUBLICATIONS

Alcatel-Lucent, "Policy based terminal triggered, ANDSF decided access selection," 3GPP TSG SA WG2 Architecture—S2#63, S2-081658, Feb. 2008, 6 pages.*
Motorola Mobility, "Conclusions for Traffic Identification based on Application," SA WG2 Meeting #88, S2-115284, Nov. 2011, 6 pages.*
Alcatel-Lucent, "Policy based terminal triggered, ANDSF decided access selection," 3GPP TSG SA WG2 Architecture—S2 #63, S2-081658, Feb. 2008, 6 pages.
3rd Generation Partnership Project (3GPP), "Technical Specification Group Core Network and Terminals; Access Network Discovery and Selection Function (ANDSF) Management Object (MO) (Release 10)," 3GPP TS 24.312 V10.5.0, XP-050580148, Mar. 2012, 156 pages.
3rd Generation Partnership Project (3GPP), "Technical Specification Group Services and System Aspects; Data Identification in Access Network Discovery and Selection Function (ANDSF) (DIDA) (Release 11)," 3GPP TR 23.855 V11.0.0, XP-050554530, Dec. 2011, 11 pages.
Qualcomm Incorporated, "Discussion paper on DIDA operative system leaf," 3GPP TSG CT WG1 Meeting #79, C1-122885, Jul. 2012, 7 pages.
European Patent Office Application Serial No. 13763459.8, Search Report dated Nov. 9, 2015, 11 pages.
Qualcomm Incorporated, "A 3G/LTE Wi-Fi Offload Framework: Connectivity Engine (CnE) to Manage Inter-System Radio Connections and Applications," Jun. 2011, 15 pages.
PCT International Application No. PCT/KR2013/002226, Written Opinion of the International Searching Authority dated Jul. 1, 2013, 1 page.

\* cited by examiner

METHOD AND APPARATUS FOR SELECTING WIRELESS ACCESS USING APPLICATION IDENTIFICATION INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/002226, filed on Mar. 19, 2013, which claims the benefit of U.S. Provisional Application Ser. No. 61/612,400, filed on Mar. 19, 2012, 61/620,445, filed on Apr. 5, 2012, 61/623,073, filed on Apr. 12, 2012 and 61/754,648, filed on Jan. 21, 2013, the contents of which are all hereby incorporated by reference herein in their entirety.

TECHNICAL FIELD

The present invention relates to a wireless communication system, and more particularly, to a method of selecting a wireless access using application identification information and apparatus therefor.

BACKGROUND ART

Access network discovery and selection function (ANDSF) is an entity in an EPC (evolved packet core) of SAE (system architecture evolution) for 3GPP ($3^{rd}$ generation partnership project) compatible mobile network. The ANDSF is introduced as 3GPP compatible user equipments (UEs) capable of accessing non-3GPP data networks increase. The ANDSF is responsible for a function of discovering a non-GRPP access network (e.g., wireless LAN (WLAN or WiFi), Wimax, etc.) used by a UE for a data communication in addition to a 3GPP access network (e.g., LTE (long term evolution), LTE-A (LTE-advanced), etc.) and providing rules and policies required for accessing the corresponding networks.

Depending on an operator's setup, ANDSF can provide a UE with inter-system mobility policy (ISMP), inter-system routing policy (ISRP), discovery information and the like. The ISMP can include a network selection rule for a UE to select a single active access network connection (e.g., WiFi, LTE, etc.). The ISRP can include a network selection rule for a UE to select at least one potential active access network connection (e.g., both WiFi and LTE). In accordance with an operator policy and user preferences, the UE may be able to use IFOM (IP (Internet Protocol) Flow Mobility), MAPCON (Multiple-Access PDN (Packet Data Network) Connectivity), NSWO (Non-Seamless WLAN Offload), or SIPTO (Selected IP Traffic Offload). The discovery information can include a list of available networks nearby a UE and an information helping a connection to the corresponding network.

DISCLOSURE OF THE INVENTION

Technical Task

The technical task of the present invention is to provide a method of efficiently performing a selection and/or offload of a radio access network in consideration of an application identification information.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of selecting a wireless access in a user equipment of a wireless communication system according to one embodiment of the present invention may include the steps of receiving a touring policy information from a network, discriminating data based on the routing policy information and selecting the wireless access per the discriminated data, and transmitting the discriminated data through the selected wireless access, wherein the routing policy information includes an application identification information for discrimination of the data and an OS (operating system) identification information.

To further achieve these and other advantages and in accordance with the purpose of the present invention, as embodied and broadly described, a method of providing a routing policy information in a network node of a wireless communication system according to another embodiment of the present invention may include the steps of determining the routing policy information including an application identification information for discrimination of data for a user equipment and an OS (operating system) identification information and transmitting the routing policy information to the user equipment, wherein the data are discriminated in the user equipment based on the routing policy information, wherein a wireless access is determined per the discriminated data, and wherein the determined wireless access is used for a transmission of the discriminated data.

To further achieve these and other advantages and in accordance with the purpose of the present invention, as embodied and broadly described, in selecting a wireless access in a wireless communication system, a user equipment device according to further embodiment of the present invention may include a transceiving module and a processor receiving a routing policy information from a network node using the transceiving module, the processor discriminating data based on the routing policy information, the processor selecting the wireless access per the discriminated data, the processor configured to transmit the discriminated data through the selected wireless access using the transceiving module, wherein the routing policy information includes an application identification information for discrimination of the data and an OS (operating system) identification information.

To further achieve these and other advantages and in accordance with the purpose of the present invention, as embodied and broadly described, in providing a routing policy information in a wireless communication system, a network node device according to another further embodiment of the present invention may include a transceiving module and a processor determining the routing policy information including an application identification information for discrimination of data for a user equipment and an OS (operating system) identification information, the processor configured to transmit the routing policy information to the user equipment using the transceiving module, wherein the data are discriminated in the user equipment based on the routing policy information, wherein a wireless access is determined per the discriminated data, and wherein the determined wireless access is used for a transmission of the discriminated data.

The following matters may be commonly applicable to the embodiments of the present invention.

The application identification information and the OS identification information may be defined as a sub-category of IPFlow in at least one of ForFlowBased category and ForNonSeamlessOffload category of the routing policy information.

If the application identification information is defined, the OS identification information can be defined.

The data may be discriminated by a combination of the application identification information and the OS identification information.

The method may further include the step of transmitting a message for requesting the routing policy information to the network node, wherein the routing policy information may be provided in response to the request.

The method may further include the step of transmitting an information of the user equipment related to determination of the routing policy information to the network node, wherein the routing policy information may be determined based on the information of the user equipment and wherein the information of the user equipment may include information on at least one selected from the group consisting of a model name, a model number, a supportable wireless access type, a display resolution, a battery, a software platform and a hardware platform of the user equipment.

If the routing policy information includes the OS identification information, the routing policy information further may include at least one of an OS version information and a platform information.

The routing policy information may be periodically provided to the user equipment.

The routing policy information may be determined based on at least one of an operator's policy and setting.

The routing policy information may include ISRP (inter-system routing policy).

The network node may include ANDSF (access network discovery and selection function).

The wireless access may include one of WiFi, Wimax, LTE (long term evolution), UMTS (universal mobile telecommunication system) and HSPA (high sped packet access).

The aforementioned general description and the detailed description of the present invention mentioned in the following description are exemplary and provided for the additional description of the invention described as claims.

Advantageous Effects

The present invention can provide a method and apparatus for efficiently performing a selection and/or offload of a radio access network in consideration of an application identification information.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
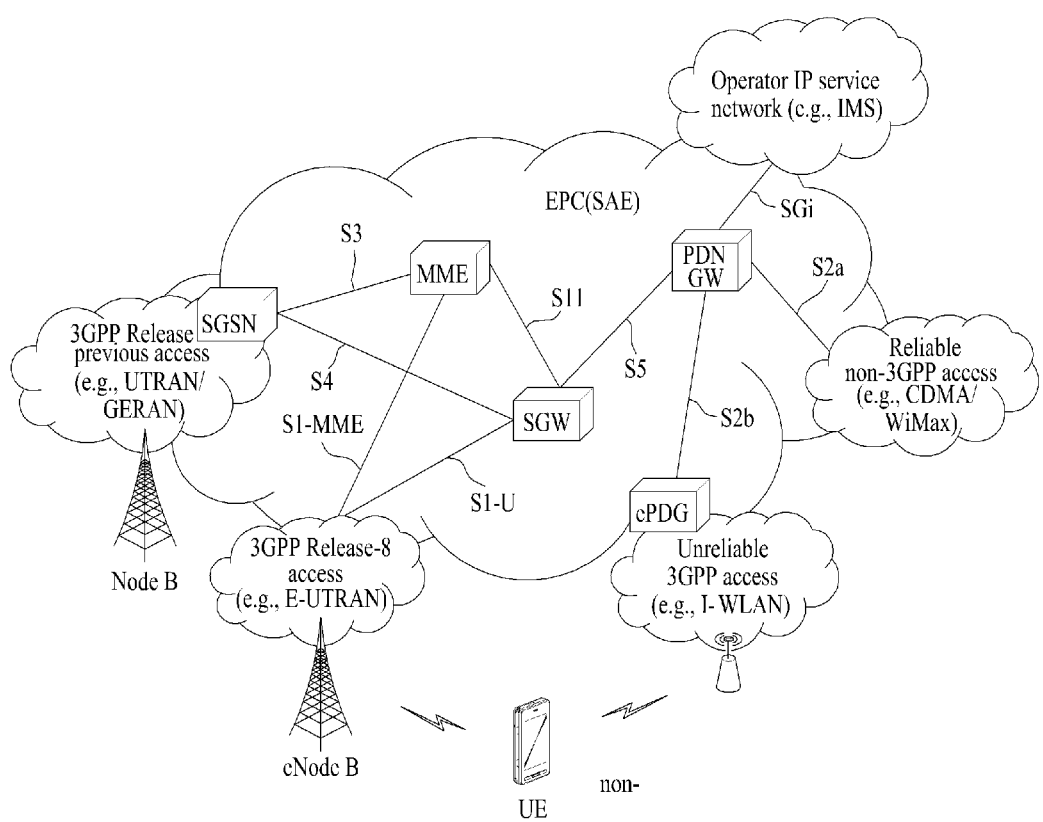
FIG. 1 is a diagram for a schematic structure of EPS (evolved packet system) including RPC (evolved packet core).

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

Specific terminologies used for the following description may be provided to help the understanding of the present invention. And, the use of the specific terminology may be modified into other forms within the scope of the technical idea of the present invention.

Occasionally, to avoid obscuring the concept of the present invention, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention can be supported by the disclosed standard documents of at least one of wireless access systems including IEEE (institute of electrical and electronics engineers) 802 series system, 3GPP system, 3GPP LTE system, and 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description can apply to various wireless access systems. For clarity, the following description mainly concerns 3GPP LTE system and 3GPP LTE-A system, by which the technical idea of the present invention may be non-limited.

Terminologies mentioned in the present document can be defined as follows.

UMTS (Universal Mobile Telecommunications System): $3^{rd}$ generation mobile communication technology developed by 3GPP on the basis of GSM (Global System for Mobile Communication).

EPS (Evolved Packet System): Network system configured with EPC (Evolved Packet Core) corresponding to an IP based packet switched core network and an access network such as LTE, UTRAN and the like. This is a UMTS evolved network.

NodeB: Base station of GERAN/UTRAN. This is installed outdoor and its coverage amounts to a macro cell scale.

eNodeB: Base station of LTE. This is installed outdoor and its coverage amounts to a macro cell scale.

HNB (Home NodeB): CPE (Customer Premises Equipment) configured to provide UTRAN (UMTS Terrestrial Radio Access Network) coverage. For details, the standard document TS 25.467 can be referred to.

HeNB (Home eNodeB): CPE (Customer Premises Equipment) configured to provide E-UTRAN (Evolved-UTRAN) coverage. For details, the standard document TS can be referred to.

UE (User Equipment): User device. UE can be called such a terminology as a terminal, an ME (Mobile Equipment), an MS (Mobile Station) and the like. The UE may include such a portable device as a notebook (laptop), a mobile phone, a PDA (Personal Digital Assistant), a smartphone, a multimedia device and the like. Moreover, the UE may include such a non-portable device as a PC (Personal Computer), a vehicle mounted device and the like. The UE is configured to communicate by 3GPP spectrum such as LTE and/or non-3GPP spectrum such as WiFi, Public Safety Spectrum and the like.

RAN (Radio Access Network): Unit including NodeB, eNodeB and RNC (Radio Network Controller) for controlling the NodeB or eNodeB. This exists between UE and core network and provides a connection to a core network.

MME (Mobility Management Entity): Network node of EPS network for performing Mobility Management (MM) function and Session Management (SM) function.

HLR/HSS (Home Location Register/Home Subscriber Server): Database having subscriber information in 3GPP network. HSS is able to perform such a function as configuration storage, identity management, user status storage and the like.

PDN-GW (Packet Data Network-Gateway)/PGW: Network node of EPS network for performing such a function as UE IP address assignment, packet screening & filtering, charging data collection and the like.

SGW (Serving Gateway): Network node of EPS network for performing such a function as mobility anchor, packet routing, idle mode packet buffering, a function of triggering MME to page UE, and the like.

PCRF (Policy and Charging Rule Function): Node of EPS network for making a policy decision to dynamically apply QoS (Quality of Service) and charging policy differentiated per service flow.

OMA DM (Open Mobile Alliance Device Management): This is a protocol designed to manage such a mobile device as a mobile phone, a PDA, a mobile PC and the like and performs such a function as a device configuration, a firmware upgrade, an error report and the like.

OAM (Operation Administration and Maintenance): OAM is a network management function set that provides network error indication, performance information, data, diagnosis and the like.

NAS (Non-Access Stratum): Upper stratum of a control plane between UE and MME. This is a functional layer for exchanging signaling and traffic messages between UE and core network in LTE/UMTS protocol stack and its major functions are to support mobility of UE and a session management procedure for establishing and managing IP connection between UE and PDN GW.

PDN (Packet Data Network): Network in which such a server configured to support a specific service as an MMS (Multimedia Messaging Service) server, a WAP (Wireless Application Protocol) server and the like is located.

PDN connection: Logical connection between UE and PDN by being represented as a single IP address (single IPv4 address and/or single IPv6 prefix).

APN (Access Point Name): Text string indicating or identifying a PDN. In order to access a requested service or network (PDN), it is necessary to pass through a corresponding PGW. Hence, APN is a name (i.e., text string) previously defined in a network to discover the corresponding PGW. For instance, APN can be denoted by internet.mnc012.mcc345.gprs.

AS (Access-Stratum): This includes a protocol stack between UE and radio network or between UE and access network. This is a layer responsible for a data transmission, a network control signal transmission and the like.

PLMN (Public Land Mobile Network): Network configured to provide a mobile communication service to individuals. This can be configured in a manner of being discriminated for each operator.

MAPCON (Multiple-Access PDN Connectivity): Technology for supporting establishment of a plurality of PDN connections through different access networks.

IFOM (IP Flow Mobility): Technology for moving a wireless access by IP flow unit seamlessly or selectively.

NSWO (Non-Seamless WLAN Offload): Technology for transmitting IP flow by internet through WLAN access network but failing to secure mobility instead of transferring IP flow seamlessly.

LIPA (Local IP Access): Technology for an IP capable UE to access another IP capable entity in the same IP network via H(e)NB.

DIDA (Data Identification for ANDSF): Technology for identifying/discriminating data to select a preferred access network.

SIPTO (Selected IP Traffic Offload): Technology for diverting user's traffic in a manner that an operator selects a PGW (Packet data network GateWay) located physically close to a UE in EPC network.

The following description is made based on the above-defined terminologies.

EPC (Evolved Packet Core)

FIG. 1 is a diagram for a schematic structure of EPS (evolved packet system) including RPC (evolved packet core).

The EPC is a core element of SAE (system architecture evolution) for enhancing performance of the 3GPP technologies. The SAE corresponds to a study task for determining a network structure supportive of mobility between various kinds of networks. For instance, the goal of the SAE is to provide an optimized packet-based system capable of supporting various wireless access technologies based on IP and providing a further enhanced data transmission capability.

In particular, the EPC is a core network of an IP mobile communication system for 3GPP LTE system and is able to support a packet-based real-time/non-real-time service. In an existing mobile communication system (e.g., $2^{nd}$ generation mobile communication system, $3^{rd}$ generation mobile communication system, etc.), a function of the core network is implemented through 2 distinctive subdomains such as a CS (circuit-switched) subdomain for audio and a PS (packet-switched) subdomain for data. Yet, in the 3GPP LTE system evolved from the $3^{rd}$ generation mobile communication system, the CS subdomains and the PS subdomains are integrated into a single IP domain. In particular, in the 3GPP LTE system, a connection between user equipments having IP capability can be configured through an IP based base station (e.g., eNodeB (evolved Node B)), an EPC, and an application domain (e.g., IMS (IP multimedia subsystem)). In particular, the EPC is the structure mandatory for end-to-end IP service implementation.

The EPC can include various components. In the example shown in FIG. 1, the EPC includes some of the various components such as SGW (Serving Gateway), PDN GW (Packet Data Network Gateway), MME (Mobility Management Entity), SGSN (Serving GPRS (General Packet Radio Service) Supporting Node), and ePDG (enhanced Packet Data Gateway).

The SGW operates as a boundary point between a RAN (Radio Access Network) and a core network and is the component playing a role in maintaining a data path between an eNodeB and a PDN GW. If a user equipment moves across an area served by an eNodeB, the SGW plays a role as a mobility anchor point. In particular, for the mobility within Evolved-UMTS (Universal Mobile Telecommunications System) Terrestrial Radio Access Network defined after E-UTRAN (3GPP Release-8, packets can be routed through the SGW. And, the SGW can play a role as an anchor point for mobility with another 3GPP network (i.e., RAN defined before 3GPP Release-8) (e.g., UTRAN, GERAN (GSM/EDGE (Global System for Mobile Communication/Enhanced Data rates for Global Evolution) Radio Access Network).

The PDN GW corresponds to a termination end point of a data interface toward a packet data network. The PDN GW is able to support policy enforcement features, packet filtering, charging support and the like. And, the PDN GW can play a role as an anchor point for management of mobility with 3GPP network and non-3GPP network (e.g., an unreliable network such as I-WLAN (Interworking Wireless Local Area Network), a reliable network such as CDMA (Code Division Multiple Access) network and WiMax).

In the example of the network structure shown in FIG. 1, the SGW and the PDN GW are configured as separate gateways, respectively. Alternatively, the two gateways can be implemented according to a single gateway configuration option.

The MME is the component that performs signaling and control functions for supporting an access for a network connection of a user equipment, allocation of network resources, tracking, paging, roaming, handover and the like. The MME controls control plane function related to subscriber and session managements. The MME manages a number of eNodeB's and performs a signaling for selecting an existing gateway for a handover into a different 2G/3G network. And, the MME performs such a function as Security Procedures, Terminal-to-network Session Handling, Idle Terminal Location Management, and the like.

The SGSN handles all packet data for user's mobility management and authentication for a different 3GPP network (e.g., GPRS network).

The ePDG plays a role as a security node for an unreliable non-3GPP network (e.g., I-WLAN, WiFi hotspot, etc.).

As mentioned in the foregoing description with reference to FIG. 1, a user equipment having IP capability can access an IP service network (e.g., IMS) provided by a service provider (i.e., an operator) via various components within the EPC based on a non-3GPP access as well as on a 3GPP access.

Moreover, FIG. 1 shows various reference points (e.g., S1-U, S1-MME, etc.). In the 3GPP system, a conceptional link for connecting 2 functions existing in different functional entities of E-UTRAN and EPC is defined as a reference point. Table 1 organizes the reference points shown in FIG. 1. Various reference points can exist in accordance with network structures as well as the examples shown in Table 1.

TABLE 1

| Reference point | Description |
|---|---|
| S1-MME | Reference point for a control plane protocol between E-UTRAN and MME |
| S1-U | Reference point between E-UTRAN and SGW for inter-eNodeB path switching during a handover and user plane tunneling per bearer |
| S3 | Reference point between MME and SGSN providing user and bearer information exchange for inter-3GPP access network mobility in idle and/or active state. This reference point is usable for intra-PLMN or inter-PLMN (e.g., case of inter-PLMN handover). |
| S4 | Reference point between SGW and SGSN providing a related control and mobility support between 3GPP anchor functions of GPRS core and SGW. If a direct tunnel is not established, this reference point provides user plane tunneling. |
| S5 | Reference point providing user plane tunneling and tunnel management between SGW and PDN GW. Due to UE mobility and for a requested PDN connectivity, if a connection to PDN GW failing to be co-located with SGW is necessary, this reference point is used for SGW rearrangement. |
| S11 | Reference point between MME and SGW |
| SGi | Reference point between PDN GW and PDN. The PDN may include an operator external common or a private PDN or an intra-operator PDN for providing IMS service for example. This reference point corresponds to Gi of 3GPP access. |

The S2a and S2b among the reference points shown in FIG. 1 correspond to non-3GPP interfaces. The S2a is a reference point that provides a user plane with a related control and mobility support between a reliable non-3GPP access and PDN GW. The S2b is a reference point that provides a user plane with a related control and mobility support between ePDG and PDN GW.

Access Network Selection

In Release 10 (Rel-10) of 3GPP standard, such a technology as MAPCON, IFOM, NSWO, LIPA, SIPTO and the like was discussed in consideration of multiple access network (e.g., LTE and WiFi).

The MAPCON is the technology for supporting PDN connections to different APNs via different access systems. For instance, for a selective transfer between accesses of PDN connections or in order to transfer all PDN connections of a prescribed access system to another access system, a UE can indicate a new PDN connection in a previously unused access or one of accesses simultaneously connected already. To this end, it is able to apply an operator's control for the routing of active PDN connections across available accesses. For instance, according to MAPCON, a method of transmitting data can be supported in a manner of configuring 3GPP access and WiFi access with corresponding PDN connections, respectively.

The IFOM is the technology for supporting seamless IP flow mobility and offload. For instance, it is able to support a simultaneous connection to the same PDN through different accesses, a routing of a different IP flow of the same ODM connection through different accesses, a transfer of an IP flow of the same PDN connection from one access to another access anytime, and the like. For instance, according to IFOM, data can be transmitted in a manner of binding 3GPP access and WiFi access with a single PDN or a single PDN GW.

The NSWO is the technology for supporting WLAN offload failing to secure seamless mobility. For instance, an IP flow connected by EPC access can be transmitted by internet through WLAN access network. Yet, since the seamless mobility is not supported, in case that an IP flow once connected to WLNA access network is connected to EPC network again, the corresponding flow is seamed and then connected to the EPC network again.

The LIPA may be the technology that an IP capable UE supports an access to another IP capable entity in the same residential/enterprise IP network via H(e)NB. LIPA traffic supports an access to a resource on a local network (i.e., a network located at a customer's home, a network located in a company, etc.) not via a mobile operator network but via H(e)NB.

The SIPTO means a method of selecting an optimal path in a macro cell (e.g., eNB) access network or a method for an operator to divert traffic to a wired network (i.e., a fixed network) not via a wireless network (i.e., a core network) in a femto cell (e.g., HeNB) access network. The method can be regarded as a method of transmitting data by minimizing a path on a wireless network and can be implemented by reconfiguring a PDN connection in accordance with a location of an accessed cell. According to SIPTO, an optical path for a specific PDN connection or an offload to H(e)NB can be provided.

In order to efficiently provide the interworking between the above-mentioned access networks different from each other, it is able to define and use an entity called ANDSF (or an ANDSF server). The ANDSF has a control function and a data management function required for providing information (e.g., ISMP, ISRP, access network discovery information, etc.) that helps an access network discovery access and a network selection in accordance with an operator's policy. An operation for the ANDSF to provide the related information in response to an access network discovery information request from a UE is named a pull mode operation. And, an operation for the ANDSF to start to provide access network discovery/selection related information to the UE is named a push mode operation. Thus, using the ANDSF that provides a policy for a transfer between heterogeneous networks and the like, when several different wireless accesses are available, it is able to provide a method of selecting and using a specific wireless access in accordance with preferences among the different wireless accesses.

Figure 2:
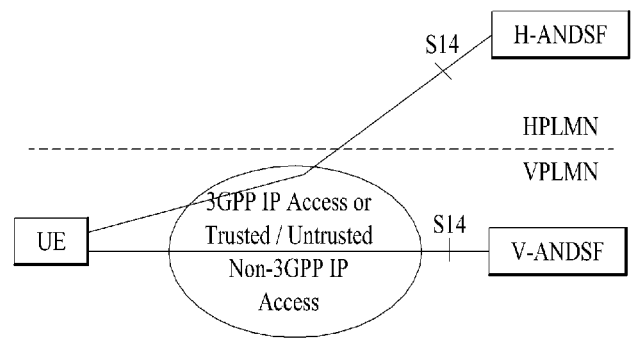
FIG. 2 is a diagram of ANDSF structure.

FIG. 2 is a diagram of ANDSF structure.

Referring to FIG. 2, a UE is able to access an ANDSF through a reference point S14. The S14 is an IP based interface and is independently defined in an access technology. In particular, the UE can access the ANDSF through any one of a 3GPP access and a non-3GPP access. Moreover, it is able to manage ISMP, ISRP and access network discovery information, which are saved in the UE, using OMA DM.

The ANDSF can provide a policy of an operator in a home network (e.g., Home-PLMN (H-PLMN)) (i.e., case of H-ANDSF). In case of roaming or the like, when a UE accesses a visited network (e.g., Visited-PLMN (V-PLMN)), the ANDSF provides the UE with a policy information of the corresponding network (i.e., case of V-ANDSF), thereby enabling the UE to operate by the operator's policy.

4 kinds of elements considered to determine a routing policy (i.e., ISRP) in ANDSF according to an existing method are defined as follows: 1) PDN identifier (e.g., APN) used by UE for a given connection; 2) destination IP address for UE to transmit traffic; 3) destination port number for UE to connect; and 4) combinations of 1) to 3).

Meanwhile, a further subdivided and efficient traffic routing policy is necessary to keep up with various types of operation related to a multiple access network, evolution of UE, diverse service types provided to a user, diversification of application properties, operator's demands and the like. Yet, the above-mentioned 4 kinds of the previously defined elements are not enough to set up a routing policy that meets the above-mentioned various requests. Hence, there is a problem that an access network selection is performed inefficiently.

The present invention proposes an enhanced access network selecting method to solve the above-mentioned problem. In particular, the present invention provides additional elements considered for a routing policy decision and an access network selection. In case that the additional elements are applied, a detailed method of deciding a routing policy and selecting an access network is provided by the present invention.

Defining New Parameters for Data Discrimination

When a UE transmits data, it is able to select a wireless access or a network interface (or a PDN connection) based on various references. In doing so, a reference for the selection can be determined with reference to such a policy information as ISRP provided by ANDSF.

An existing ISRP format is defined as Table 2.

TABLE 2

<X>/ISRP/ <X>/ISRP/<X> <X>/ISRP/<X>/RulePriority
<X>/ISRP/<X>/ForFlowBased <X>/ISRP/<X>/ForFlowBased/<X>/
<X>/ISRP/<X>/ForFlowBased/<X>/IPFlow
<X>/ISRP/<X>/ForFlowBased/<X>/IPFlow/<X>/
<X>/ISRP/<X>/ForFlowBased/<X>/IPFlow/<X>/ Address Type
<X>/ISRP/<X>/ForFlowBased/<X>/IPFlow/<X>/ StartSourceIPaddress
<X>/ISRP/<X>/ForFlowBased/<X>/IPFlow/<X>/ EndSourceIPaddress
<X>/ISRP/<X>/ForFlowBased/<X>/IPFlow/<X>/ StartDestIPaddress
<X>/ISRP/<X>/ForFlowBased/<X>/IPFlow/<X>/
EndDestIPaddress<X>/ISRP/<X>/ForFlowBased/<X>/IPFlow/<X>/ ProtocolType
<X>/ISRP/<X>/ForFlowBased/<X>/IPFlow/<X>/ StartSourcePortNumber TABLE 2-continued

```
<X>/ISRP/<X>/ForFlowBased/<X>/IPFlow/<X>/ EndSourcePortNumber
<X>/ISRP/<X>/ForFlowBased/<X>/IPFlow/<X>/ StartDestPortNumber
<X>/ISRP/<X>/ForFlowBased/<X>/IPFlow/<X>/ EndDestPortNumber
<X>/ISRP/<X>/ForFlowBased/<X>/IPFlow/<X>/QoS
<X>/ISRP/<X>/ForFlowBased/<X>/RoutingCriteria
<X>/ISRP/<X>/ForFlowBased/<X>/RoutingCriteria/<X>/
<X>/ISRP/<X>/ForFlowBased/<X>/RoutingCriteria/<X>/ ValidityArea
<X>/ISRP/<X>/ForFlowBased/<X>/RoutingCriteria/<X>/ TimeOfDay
<X>/ISRP/<X>/ForFlowBased/<X>/RoutingCriteria/<X>/ APN
<X>/ISRP/<X>/ForFlowBased/<X>/RoutingRule ...<X>/ISRP/<X>/ForServiceBased
<X>/ISRP/<X>/ForServiceBased/<X>/ <X>/ISRP/<X>/ForServiceBased/<X>/ APN
<X>/ISRP/<X>/ForServiceBased/<X>/RoutingCriteria
<X>/ISRP/<X>/ForServiceBased/<X>/RoutingCriteria/<X>/
<X>/ISRP/<X>/ForServiceBased/<X>/RoutingCriteria/ <X>/ ValidityArea
<X>/ISRP/<X>/ForServiceBased/<X>/RoutingCriteria/<X>/ TimeOfDay
<X>/ISRP/<X>/ForServiceBased/<X>/RoutingRule...<X>/ISRP/<X>/ForNonSeamle
ssOffload/<X>/ISRP/<X>/ForNonSeamlessOffload/<X>/<X>/ISRP/<X>/ForNonSea
mlessOffload/<X>/IPFlow<X>/ISRP/<X>/ForNonSeamlessOffload/<X>/
IPFlow/<X><X>/ISRP/<X>/ForNonSeamlessOffload/<X>/IPFlow/<X>/
AddressType<X>/ISRPkX>/ForNonS eamless Offload/<X>/IPFlow/<X>/
StartSourceIPaddress<X>/ISRP/<X>/ForNonSeamlessOffload/<X>/IPFlow/<X>/
EndSourceIPaddress<X>/ISRP/<X>/ForNonSeamlessOffload/<X>/IPFlow/<X>/
StartDestIPaddress<X>/ISRP/<X>/ForNonSeamlessOffload/<X>/IPFlow/<X>/
EndDestIPaddress<X>/ISRP/<X>/ForNonSeamlessOffload/<X>/IPFlow/<X>/
ProtocolType<X>/ISRP/<X>/ForNonSeamlessOffload/<X>/IPFlow/<X>/
StartSourcePortNumber<X>/ISRP/<X>/ForNonSeamlessOffload/<X>IPFlow/<X>/
EndSourcePortNumber<X>/ISRP/<X>/ForNonSeamlessOffload/<X>IPFlow/<X>/
StartDestPortNumber<X>/ISRP/<X>/ForNonSeamlessOffload/<X>/IPFlow/<X>/
EndDestPortNumber<X>/ISRP/<X>/ForNonSeamlessOffload/<X>/IPFlow/<X>/
QoS<X>/ISRP/<X>/ForNonSeamlessOffload/<X>/
RoutingCriteria<X>/ISRP/<X>/ForNonSeamlessOffload/<X>/
RoutingCriteria/<X>/<X>/ISRP/<X>/ForNonSeamlessOffload/<X>/
RoutingCriteria/<X>/ValidityArea<X>/ISRP/<X>/ForNonSeamlessOffload/<X>/
RoutingCriteria/<X>/TimeOfDay<X>/ISRP/<X>/ForNonSeamlessOffload/<X>/
RoutingCriteria/<X>/APN<X>/ISRP/<X>/ForNonSeamlessOffload/<X>/
RoutingRule...
```

In Table 2, <X> indicates a placeholder and can be understood as a hierarchical extension. <X>/Name means a name of ANDSF Management Object (MO) configuration. In particular, <X>/ISRP/ is a placeholder of policies for ISRP. <X>/ISRP/<X>/RulePriority means a priority given to a specific rule and can be represented as a numerical value. Although Table 2 shows one example of applying by priority for ISRP, the priority can apply per category or rule. Various MO parameters shown in Table 2 are exemplary and a detailed meaning of each of the parameters can refer to the document 3GPP TS 24.312.

Referring to Table 2, ForFlowBased, ForServiceBased and ForNonSeamlessOffload are mainly defined as the category of policy for ISRP. And, sub-parameters are defined for each category. For instance, as sub-parameters for the category ForFlowBased, it is able to assume a case of setting an address type (AddressType), a source address range (i.e., StartSourceIPaddress to EndSourceIPaddress), a destination address range (i.e., StartDestIPaddress to EndDestIPaddress), and a range of port numbers of source and destination (StartSourcePortNumber, EndSourcePortNumber, StartDestPortNumber, EndDestPortNumber) to specific values, determining TimeofDay of RoutginCriteria as 3 to 6 o'clock, and setting APN of RoutginCriteria to a specific APN. In this case, it means that data transmitted to a corresponding address range of a corresponding address type is transmitted to the specific APN between 3 o'clock and 6 o'clock. Moreover, a priority for a flow to which this rule applies can be applied. Alternatively, the flow can be set to be transmitted through a specific access in accordance with a preference setting of an operator and/or a user equipment. Having received such ISRP information, a UE selects an access network in accordance with the corresponding ISRP and is able to transceive data by the configured rule.

An existing ISRP is defined as the category and sub-parameters shown in Table 2, which corresponds to a scheme of setting an accurate data of an address information and a port number of a service in advance. In this case, when an internet PDN is used, since data (or flows) of various features (or attributes) can be transceived through the same internet PDN, it is difficult to clearly discriminate whether a specific data (or flow) has a prescribed feature. Although one feature of data can be represented using QoS (quality of service), since it is frequently difficult to know QoS information at a timing point of determining ISRP in advance, it is difficult to discriminate data on the basis of QoS.

In a recent mobile communication system environment, since a user is frequently provided with a data service using a smartphone in general, data are increasingly delivered through an internet PDN. Internet data is provided in form of a web based document using HTTP (hypertext transfer protocol) through a specific service provider (e.g., Google, YouTube, etc.) and can include media of various attributes. Since media of various attributes use the same port number in using HTTP, it is unable to individually process a plurality of media that use the same single port by a previously defined method. For instance, since a plurality of media can include video, audio, text and application (e.g., player), only if they can be processed discriminatively, such a technology introduced into 3GPP Release-10 as MAPCON, IFOM, NWSO, SIPTO and the lie can be efficiently utilized. For instance, in order to support an operation of receiving video/audio media and text/application through WiFi and LTE, respectively, using 3GPP access (e.g., LTE) and non-3GPP access (e.g., WiFi) simultaneously or an operation of offloading a portion of media received through 3GPP access to WiFi, or the like, it is necessary to process each media individually. Yet, it is unable to correctly support the above operations using an existing port number parameter or a protocol type parameter only. Therefore, it is necessary for ISRP to define an additional category or parameter capable of discriminating data of various attributes.

To this end, the present invention proposes a method of efficiently discriminating data of various attributes used to be difficult to be discriminated in a single PDN using application identification information (application id) and appropriately selecting a transmission interface (i.e., wireless access or APN) for each of the discriminated data of various attributes.

Moreover, the application id, which is a newly defined category (or a newly defined parameter), can be utilized for the usage of discriminating data (or flow) in various ways by being combined with various categories or sub-parameters. For instance, the parameter 'application id' can be defined as a sub-parameter of IPFlow in the ForFlowBased category. Alternatively, the parameter 'application id' can be defined as a sub-parameter of RoutingCriteria or RoutingRule in the ForFlowBased category.

Selection of Interface Preferred for Discriminated Data

In ISRP of an existing ANDSF, RoutingRule is defined as a category for selecting a preferred interface and can include such a sub-parameter as AccessTechnology, AccessId, AccessNetworkPriority and the like.

In order to select an interface preferred for each data discriminated by the aforementioned proposal of the present invention, candidates of a selectable interface can include a cellular access (e.g., LTE, UMTS, HSPA (high speed packet access), etc.), WiFi, Wimax and the like. In case of cellular, several APNs can create various paths with a fixed network, a mobile network and the like. Hence, it is able to additionally define APN information and/or an access type (e.g., WiFi, Wimax, LTE, UMTS, HSPA, etc.) in RoutingRule. A presence or non-presence of a femto cell access or a macro cell access can be defined as a sub-setting of the access type. Moreover, it is able to define a new category to represent all interface candidates. For instance, a category shown in Table 3 can be added.

TABLE 3

<X>/ISRP/<X>/ForFlowBased/<X>...<X>/PreferedRouteing/<X>/InterfaceType = { WiFi, Wimax, LTE, UMTS, HSPA or APN_name }

Table 3 just shows one example only. According to the proposal of the present invention, a parameter indicating an interface selection can be included in ANDSF policy data.

Operation of UE Having Received ANDSF Policy Data

As mentioned in the foregoing description, data is discriminated or identified using a parameter 'application id' and ISRP of ANDSF containing information on an interface preferred for each discriminated data can be provided to a UE. Hence, the UE is able to select at least one wireless access from various wireless accesses including WiFi, UNTS, HSPA, LTE, femto cell access, macro cell access and the like. In particular, when a UE transmits data, the UE can discriminate data and determine a preferred interface, with reference to a content of ISRP. Hence, the UE can use a corresponding PDN connection (i.e., a network path determined by APN) or a corresponding interface (or access).

For instance, according to a related art method, since internet is used through a single PDN, although it is unable to discriminate various applications related to this, offload can be applied per detailed application despite using internet through a single same PDN according to the proposal of the present invention. For instance, operation can be performed in a following manner. First of all, an application related to an internet banking is serviced through a mobile network (e.g., LTE) configured to provide more powerful security. Secondly, the rest of applications are serviced through a fixed network (e.g., WiFi). To this end, in case that a target server name indicates a bank or the like, it is able to apply an independent interface for a discriminated data in a manner of transceiving a corresponding flow via a mobile network while transceiving the rest of flows via a fixed network. In case that data is discriminated with reference to a media (or contents) type, a video media is serviced via a fixed network, while the rest of media (e.g., audio, text, etc.) are serviced via a mobile network.

In the following description, examples of defining new parameters (i.e., category or subcategory defined in ISRP of ANDSF) for data discrimination according to proposals of the present invention are explained in detail.

Proposal 1

The proposal 1 of the present invention relates to a detailed method of applying ISRP policy managed by ANDSF in a manner of discriminating data (or flow) in detail. In particular, detailed methods of defining 'application id', which reflects features or attributes of an application, in ANDSF ISRP and using the defined 'application id' are proposed.

Proposal 1a

The proposal 1a of the present invention relates to a method of defining a category 'Application id (i.e., App-id)' in ISRP of ADNSF and additionally defining a category 'OS (operating system) id (i.e., OSId)'.

When traffic is transceived using internet, it is able to determine an access network (e.g., 3GPP access, WLAN (or WiFi) access, etc.) per application. For instance, the traffic of an application A can use WLAN access, while the traffic of an application B can use 3GPP access. In this case, by filtering the traffic using App-ID, ISRP is provided per application or a single ISRP containing a plurality of App-IDs can be provided.

Moreover, despite the same application, APP-ID may differ depending on an OS platform. In this case, only if OSId is provided together with App-ID, a corresponding application of a corresponding OS can be specified. For instance, an application A of android OS by Google (i.e., application A@android) may differ from an application A of iOS by Apple in id. Moreover, although App-id #xyz indicates an application A in android OS, the same App-id #xyz may indicate an application B in iOS. Hence, in order to specify (or discriminate) an application more accurately and to correctly apply an operators' policy per application, a globally unique id is necessary.

To this end, the present invention proposes to additionally define OSId category together with App-ID. For instance, referring to Table 4, OSId can be newly defined as a sub-category or parameter of IPFlow category in ForFlowBased category and/or ForNonSeamlessOffload category together with App-ID.

TABLE 4

<X>/ISRP/<X>/ForFlowBased/<X>/IPFlow/<X>/applicationId<X>/ISRP/<X>/ForlowBased/<X>/IPFlow/<X>/OSId
<X>/ISRP/<X>/ForNonSeamlessOffload/<X>/IPFlow/<X>/applicationId<X>/ISRP/<X>/ForNonSeamlessOffload/<X>/IPFlow/<X>/OSId In Table 4, OSId can be defined as existing only if App-ID category exists. This can be interpreted as the OSId is applied as a sub-category of App-ID. For instance, ISRP rule can be defined as <X>/ISRP/<X>/ForFlowBased/<X>/IPFlow/<X>/applicationId/<X>/OSId.

The OSId can be defined as a string or constant value. Table 5 in the following defines a value of OSId for example.

TABLE 5

| value | Description |
| --- | --- |
| 0 | Reserved |
| 1 | iOS |
| 2 | Android |
| 3 | Windows mobile |
| 4 | Blackberry |
| 5-255 | Reserved |

According to the example shown in Table 5, if a value of OSId category or parameter defined in ISRP of ANDSF is 1, it indicates that App-ID related to a corresponding OSId is interpreted as APP-Id indicating a specific application in iOS. The definition shown in Table 5 just shows one example, by which the scope of the present invention is non-limited.

Thus, in case that ISRP is created and provided based on OSId, an OS-specific (or OS-specific & application-specific) routing policy can be applied. Moreover, a different routing policy can be applied to each OS despite the same application. For instance, a separate routing policy rule can be applied to each of application A@android and application A@OS.

Moreover, like software or device platform (e.g., Java platform, etc.), it can be defined in detailed form such as Android with Java SE (i.e., this means android OS supportive of Java SE (Standard Edition)), Android with Java ME (i.e., this means android OS supportive of Java ME (Micro Edition)), Android with Java EE (i.e., this means android OS supportive of Java EE (Enterprise Edition)) and the like.

For instance, referring to Table 6 and Table 7, OSId with Platform category (cf. Table 6) or OSId/Platform category (cf. Table 7) can be newly defined as a sub-category or parameter of IPFlow category in ForFlowBased category and/or ForNonSeamlessOffload category.

TABLE 6

<X>/ISRP/<X>/ForFlowBased/<X>/IPFlow/<X>/applicationId<X>/ISRP/<X>/ForlowBased/<X>/IPFlow/<X>/OSId with Platform
<X>/ISRP/<X>/ForNonSeamlessOffload/<X>/IPFlow/<X>/applicationId<X>/ISRP/<X>/ForNonSeamlessOffload/<X>/IPFlow/<X>/OSId with Platform

TABLE 7

<X>/ISRP/<X>/ForlowBased/<X>/IPFlow/<X>/applicationId<X>/ISRP/<X>/ForlowBased/<X>/IPFlow/<X>/OSId<X>/ISRP/<X>/ForlowBased/<X>IPFlow/<X>/Platform
<X>/ISRP/<X>/ForNonSeamlessOffload/<X>IPFlow/<X>/applicationId<X>ISRP/<X>/ForNonSeamlessOffload/<X>IPFlow/<X>/OSId<X>/ISRP/<X>/ForNonSeamlessOffload/<X>IPFlow/<X>/Platform In Table 6 and Table 7, OSId category and Platform category (or OSID with Platform category) can be defined as existing only if App-ID category exists. This can be interpreted as meaning that OSId category and Platform category (or OSID with Platform category) are applied as sub-categories of APP-ID.

In the above example, Platform can be defined as a text string.

Moreover, limitation can be put on an application capable of operating on UE in accordance with OS version. For instance, there may exist an application filing to secure operation in iOS version 5.0 despite operating in iOS version 4.0. In this case, it is able to apply traffic filtering by defining OS version category in addition.

Although OS version can be defined as a separate category, it can be defined as a category included in OSId as well. In this case, OSId can be defined as a text string and constant value.

For instance, referring to Table 8 and Table 9, OSId with OSVer category (cf. Table 8) or OSId/OSVer category (cf. Table 9) can be newly defined as a sub-category or parameter of IPFlow category in ForFlowBased category and/or ForNonSeamlessOffload category.

TABLE 8

<X>/ISRP/<X>/ForFlowBased/<X>/IPFlow/<X>/applicationId<X>/ISRP/<X>/Forlo wBased/<X>/IPFlow/<X>/OSId with OSVer
<X>/ISRP/<X>/ForNonSeamlessOffload/<X>/IPFlow/<X>/applicationId<X>/ISRP/ <X>/ForNonSeamlessOffload/<X>/IPFlow/<X>/OSId with OSVer

TABLE 9

<X>/ISRP/<X>/ForlowBased/<X>/IPFlow/<X>/applicationId<X>/ISRP/<X>/Forlow Based/<X>/IPFlow/<X>/OSId<X>/ISRP/<X>/ForlowBased/<X>/IPFlow/<X>/OSVer
<X>/ISRP/<X>/ForNonSeamlessOffload/<X>/IPFlow/<X>/applicationId<X>/ISRP/ <X>/ForNonSeamlessOffload/<X>/IPFlow/<X>/OSId<X>/ISRP/<X>/ForNonSeamle ssOffload/<X>/IPFlow/<X>/OSVer In Table 8 and Table 9, OSId category and OSVer category (or OSID with OSVer category) can be defined as existing only if App-ID category exists. This can be interpreted as meaning that OSId category and OSVer category (or OSID with OSVer category) are applied as sub-categories of APP-ID.

OSVer can be defined as a constant value.

TABLE 10

| value | Description |
|---|---|
| 0 | Reserved |
| 1 | iOS 4.0 |
| 2 | iOS 5.0 |
| 3 | Android 2.4 |
| 4 | Android 3.0 |
| 5 | Windows mobile 8.0 |
| 6 | Windows mobile 9.0 |
| 7 | Blackberry 10.0 |
| 5-255 | Reserved |

According to the example shown in Table 10, if a value of OSVer category or parameter defined in ISRP of ANDSF is 1, it indicates that App-ID related to OSId of the corresponding OSVer is interpreted as APP-Id indicating a specific application in iOS 4.0. The definition shown in Table 10 just shows one example, by which the scope of the present invention is non-limited.

Moreover, combination of at least one of OSId, Platform and OSVer can be defined in ISRP. In particular, only if APP-ID is defined (e.g., as a sub-category of APP-ID), OSID is singly defined, OSID and Platform are defined, OSId and OSVer are defined, or OSId, Platform and OSVer may be defined.

Hence, ISRP applied data (or flow) can be discriminated by unit in consideration of APP-ID, OSId, Platform and/or OSVer. And, ISRP can be applied for each discriminated data (or traffic).

Proposal 1b

The proposal 1b of the present invention relates to a method of defining a category 'Application id (i.e., App-ID)' in ISRP of ADNSF and also defining a category 'OS (operating system) id (i.e., OSId)' independent from the App-ID. In particular, the example of the aforementioned proposal 1a defines the OSId category only if App-ID is defined (e.g., as a sub-category of the App-ID). Yet, the present proposal 1b defines APP-ID and OSId separately. Hence, a globally unique id can be defined for a specific application and ISRP of ANDSF can be defined and applied application-specifically.

In particular, App-ID category and OSId category are separately defined in the ISRP rule of ANDSF. And, whether to combine the two categories together can be determined through interaction between UE and ANDSF. In more particular, by the interaction between UE and ANDSF, ISRP rule for APP-ID is defined, ISRP rule for OSId is defined, or ISRP rule for a unique id newly defined by combination of App-ID and OSId can be defined.

To this end, the present invention proposes to define OSId category separate from App-ID. For instance, referring to Table 11, the OSId defined separate from App-ID can be newly defined as a sub-category or parameter of IPFlow category in ForFlowBased category and/or ForNonSeamlessOffload category.

TABLE 11

<X>/ISRP/<X>/ForFlowBased/<X>/IPFlow/<X>/applicationId
<X>/ISRP/<X>/ForlowBased/<X>/IPFlow/<X>/OSId
<X>/ISRP/<X>/ForNonSeamlessOffload/<X>/IPFlow/<X>/applicationId
<X>/ISRP/<X>/ForNonSeamlessOffload/<X>/IPFlow/<X>/OSId In the example shown in Table 11, although OSId category is not defined, applicationId category can be defined only. Although the applicationId category is not defined, the OSId category can be defined only. Both of the applicationId category and the OSId category can be defined together.

OSId can be defined as a text string (String) or a constant value.

In case that OSId category is defined separate from application ID in ISRP, Platform category and/or OSVer category can be defined in addition. In particular, if OSId is defined, it is defined singly, OSId and Platform are defined, OSId and OSVer are defined, or OSId, Platform and OSVer can be defined. Although Platform category may be defined as an additional category in OSId, it can be defined as a single category called 'OSId with Platform'. Although OSVer category may be defined as an additional category in OSId, it can be defined as a single category called 'OSId with OSVer'.

Proposal 1c

The proposal 1c of the present invention relates to a method of defining and using a globally unique id. The globally unique id can be defined as a combination of at least one of APP-ID, OSId, Platform and OSVer. If the globally unique id is named Global_applicationId, it can be defined as Table 12 in the following.

TABLE 12

Global_applicationId = <OSId> and/or <OSVer> and/or <Platform> and/or <applicationId>
<X>/ISRP/<X>/ForFlowBased/<X>/IPFlow/<X>/Global_applicationId
<X>/ISRP/<X>/ForNonSeamlessOffload/<X>/IPFlow/<X>/Global_applicationId If the Global_applicationId defined as Table 12 is used, ISRP applied data (or flow) can be discriminated by the unit that considers APP-ID, OSId, Platform and/or OSVer and ISRP can be applied to each of the discriminated data (or flow).

Moreover, the definition of Global_applicationId can be determined by the interaction between UE and ANDSF. Tables 13 to 15 in the following show possible examples of Global_applicationId.

TABLE 13

Global_applicationId = <OSId> <applicationId>
<X>/ISRP/<X>/ForFlowBased/<X>/IPFlow/<X>/Global_applicationId
<X>/ISRP/<X>/ForNonSeamlessOffload/<X>/IPFlow/<X>/Global_applicationId

TABLE 14

Global_applicationId = <OSId> <OSVer> <applicationId>
<X>/ISRP/<X>/ForFlowBased/<X>/IPFlow/<X>/Global_applicationId
<X>/ISRP/<X>/ForNonSeamlessOffload/<X>/IPFlow/<X>/Global_applicationId

TABLE 15

Global_applicationId = <OSId> <Platform> <applicationId>
<X>/ISRP/<X>/ForFlowBased/<X>/IPFlow/<X>/Global_applicationId
<X>/ISRP/<X>/ForNonSeamlessOffload/<X>/IPFlow/<X>/Global_applicationId

TABLE 16

Global_applicationId = <OSId> <OSVer> <Platform> <applicationId>
<X>/ISRP/<X>/ForFlowBased/<X>/IPFlow/<X>/Global_applicationId
<X>/ISRP/<X>/ForNonSeamlessOffload/<X>/IPFlow/<X>/Global_applicationId Moreover, the same application (e.g., application A) may have App-ID different per OS. In particular, id of application A in application A@Android may be different from id of application A in application A@iOS. Hence, in order to define the ISRP rule for a specific application, it is able to configure ISRP for a list of Global_applicationId (e.g., id specified by a combination of App-ID and OSId) in consideration of OSId. For instance, it is able to specify an ISRP rule applied target as shown in Table 17.

TABLE 17

<X>/ISRP/<X>/ForFlowBased/<X>/IPFlow/<X>/(application_A @ Android, application_A @ iOS)
<X>/ISRP/<X>/ForNonSeamlessOffload/<X>/IPFlow/<X>/(application_A @ Android
, application_A @ iOS)

Proposal 1d

The proposal 1d of the present invention relates to a method of defining a category for a user equipment information (UE/MS Info) in ISRP in addition to the App-ID, OSId, OSVer and Platform categories proposed by the aforementioned proposals 1a, 1b and 1c.

UE/MS Info additionally defined in ISRP of ANDSF can include a combination of at least one of 5 categories in the following.

1) Model name of UE/MS and/or model number information of UE/MS

2) Information on a supportable wireless access type of UE/MS (e.g., information on a presence or non-presence of E-UTRAN (i.e., LTE, LTE-Advanced, etc.) support, a presence or non-presence of UTRAN (i.e., UMTS) support, a presence or non-presence of GERAN (i.e., 2G) support, etc.)

3) Information on display resolution supported by UE/MS

4) Battery information of UE/MS

5) Other feature related information of UE/MS (e.g., software platform, hardware platform, etc.)

Hence, Global_applicationId can be defined as Table 18

TABLE 18

Global_applicationId = <OSId> and/or <OSVer> and/or <Platform> and/or <applicationId> and/or <UE/MSInfo>
<X>/ISRP/<X>/ForFlowBased/<X>/IPFlow/<X>/Global_applicationId
<X>/ISRP/<X>/ForNonSeamlessOffload/<X>/IPFlow/<X>/Global_applicationId Proposal 2

The proposal 2 of the present invention relates to a method for an ANDSF server to provide a UE with policy information. In the present proposal 2, the policy information of ANDSF may mean ISRP that can be applied to each data (or flow) discriminated by the App-ID and/or OSId described in the aforementioned proposal 1.

In order for an ANDSF to provide policy information to a UE, a push mode or a pull mode can be applied.

1) Push mode: an ANDSF server can provide a UE with at least one App-ID (i.e., App-ID defined per at least one OSId) defined by an operator's policy and/or setting and a corresponding ISRP rule information, as information for specifying an ISRP applied target. In this case, all of the at least one App-ID may be provided to the UE or a portion of the at least one App-ID may be selectively provided to the UE.

2) Pull mode-1: a UE is able to provide an ANDSF server with informations (e.g., OSId of at least one UE-supportable OS, App-ID of at least one UE-supportable application, etc.) that can be supported by the UE. Hence, the ANDSF server can provide the UE with at least one App-ID (i.e., App-ID defined per at least one OSId provided by the UE) and a corresponding ISRP rule information, as information for specifying an ISRP applied target, based on the information provided by the UE.

3) Pull mode-2: a UE can provide an ANDSF server with information (e.g., OSId of at least one UE-supportable OS, App-ID of at least one UE-supportable application, etc.) that can be supported by the UE. The ADNSF selects at least one APP-ID (i.e., APP-ID defined per at least one OSId) in accordance with the information provided by the UE and an operator's policy and/or setting and is then able to provide the UE with information on the selected App-ID and a corresponding ISRP rule information.

4) Hybrid mode: a UE does not provide an ANDSF with an information that can be provided by the UE but is able to send a message for requesting an ISRP to the ADNSF only.

Hence, the ANDSF can provide the UE with at least one APP-ID (i.e., App-ID defined per at least one OSId) defined in accordance with an operator's policy and/or setting and a corresponding ISRP information, as information for specifying an ISRP applied target. In this case, all of the at least one App-ID may be provided to the UE or a portion of the at least one App-ID may be selectively provided to the UE.

Hence, ISRP (i.e., ISRP applied per App-ID (or OSId based App-ID)) can be provided to the UE from the ANDSF server through a combination of at least one of the above-mentioned methods 1) to 4).

Proposal 3

The proposal 3 of the present invention relates to a method of determining a timing point for an ANDSF server to provide a UE with ISRP (i.e., ISRP applied per App-ID (or OSId based App-ID)). For instance, the ISRP can be provided by prescribed period or by determining a specific timing point.

The ISRP is provided to the UE through an OMS DM message (or SMS). In this case, information on the providing periodicity, the specific timing point and the like can be contained in the OMA DM message. Moreover, the related information on the providing period or the specific timing point can be provided to the UE by the ANDSF or the UE or can be provided (or requested) to the ANDSF by the UE.

In the following description, detailed embodiments of the present invention according to the above-described various proposals of the present invention are explained.

1st Embodiment

Figure 3:
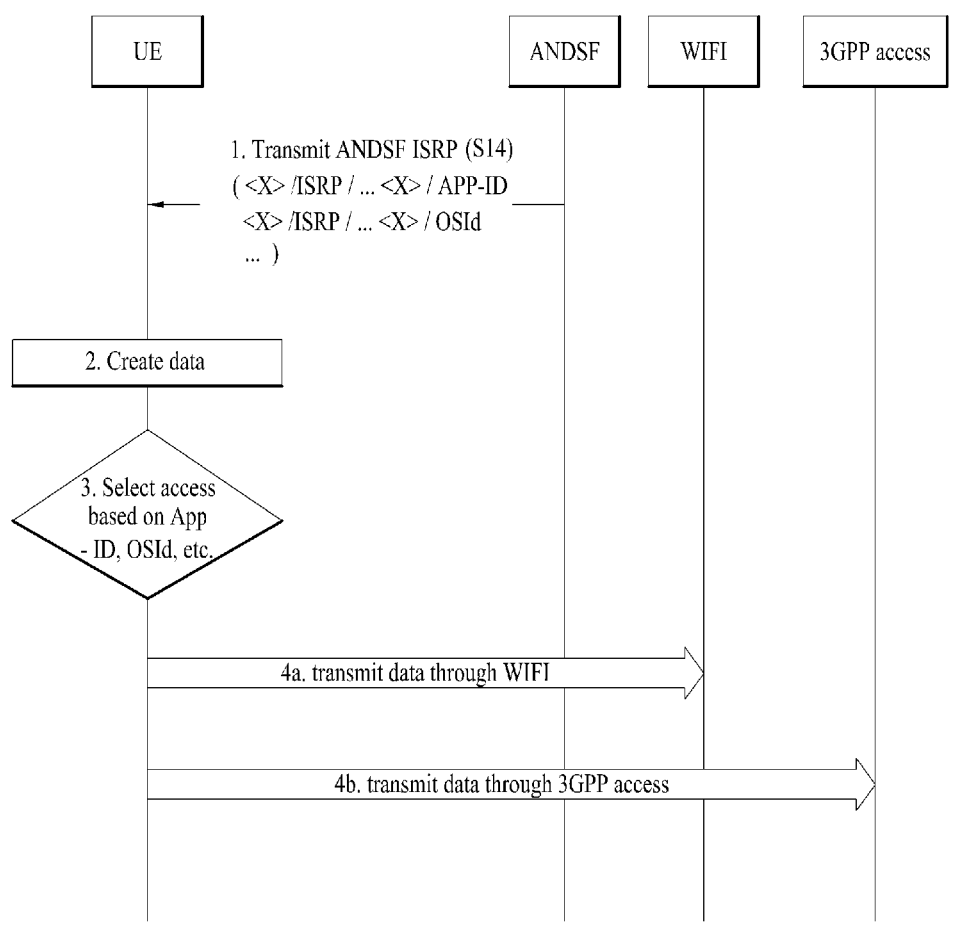
FIG. 3 is a diagram to describe a wireless access selecting method of UE according to one embodiment of the present invention.

FIG. 3 is a diagram to describe a wireless access selecting method of UE according to one embodiment of the present invention.

In a step 1 shown in FIG. 3, an ANDSF server can provide a UE with a policy information (i.e., ISRP), which becomes a reference for determining a wireless access (e.g., WiFi, 3GPP, etc.) to be used for a data transmission by the UE, through a reference point S14. In this case, the ISRP can include a combination of at least one of App-ID, OSId, OSVer, Platform and UE/MS Info, which are proposed by the present invention. For instance, App-ID category is included as an information for specifying an ISRP applied IPFlow. And, an OSId category is additionally included only if App-ID is included. Hence, it is able to indicate that an ISRP rule is applied to data (or flow) to which a specific application of a specific OS is related. In this case, the App-ID can be defined as a plurality of App-IDs for a plurality of OSIds. In accordance with an operator's policy and/or setting, one App-ID can be selected from a plurality of App-IDs for a plurality of OSIds.

In a step 2 shown in FIG. 3, a UE can create data through an application operation. An application or its platform (or OS) can deliver App-ID, OSId, address information and the like to the UE.

In a step 3 shown in FIG. 3, the UE discriminates or identifies data (or flow) using a category of the ISRP and is then able to select an access or PDN connection (or APN) for the discriminated data (or flow). In particular, the UE sorts IP flows into detailed classes through the delivered App-ID, OSId, address information and the like and is then able to select an access or PDN connection appropriate for the corresponding IP flow in accordance with the sorted class.

For instance, in case that a plurality of accesses are available for a same APN, data are discriminated with reference to a reference included in the ISRP and each of the discriminated data can be transmitted through a preferred one of a plurality of the accesses. Moreover, if the UE is able to use a new access additionally after moving, the UE selects an access in accordance with priority or preference among the accesses and is then able to transmit data through the selected access. As mentioned in the foregoing description, the reference for the UE to discriminate data can be configured with a combination of at least one of App-ID, OSId, OSVer, Platform, and UE/MS Info. The UE can determine an interface (e.g., WiFi or 3GPP access), which is to be used for data of a corresponding class) by considering the data discriminated class and the available access together.

In a step 4 shown in FIG. 3, the UE can transmit the corresponding data through the access (e.g., WiFi or 3GPP access) selected by the determination made in the step 3. For instance, data related to specific application_A@Android corresponding to a combination of App-ID=A and OSId=android is transmitted through WiFi (e.g., an AP (access point) of specific BSSID (basic service set IS) [Step 4a], while data related to specific application_B@Android corresponding to a combination of App-ID=B and OSId=android is transmitted through 3GPP access (e.g., eNB of LET) [Step 4b].

$2^{nd}$ Embodiment

Figure 4:
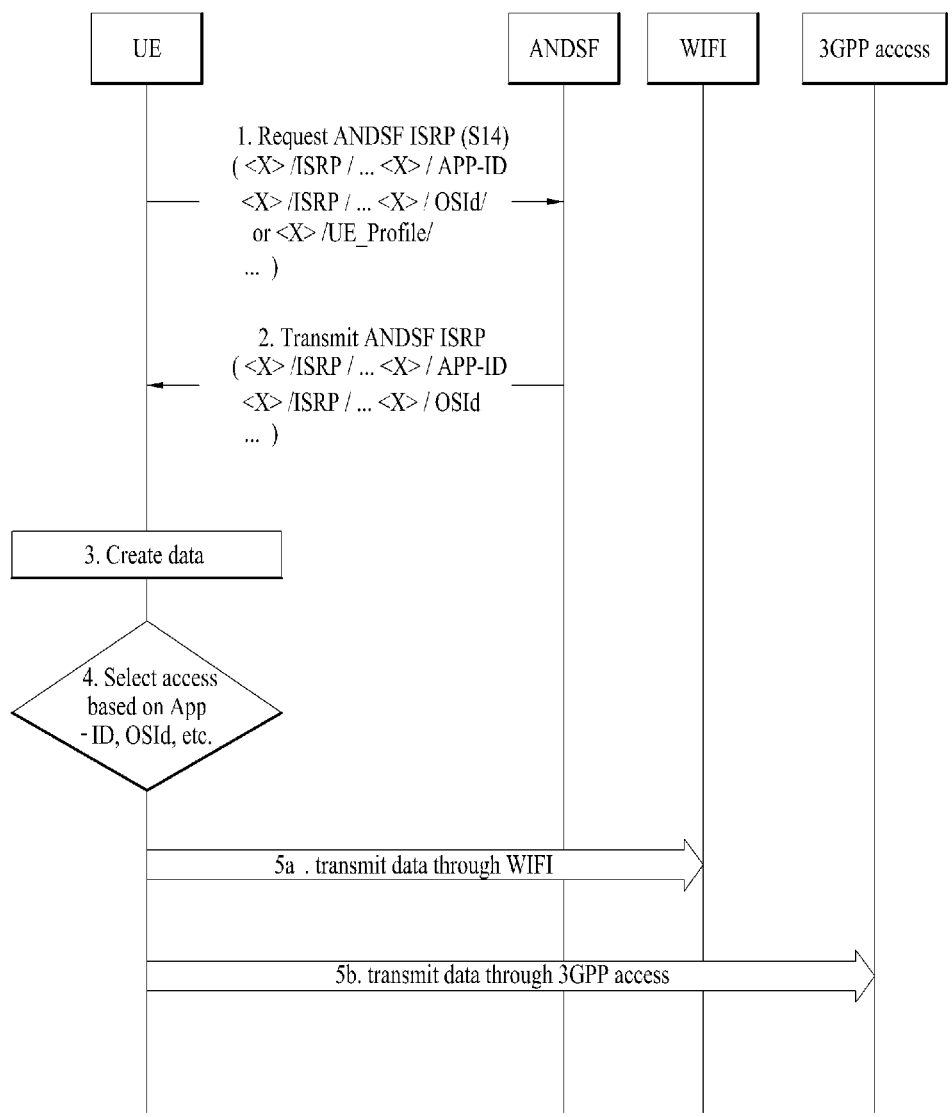
FIG. 4 is a diagram to describe a wireless access selecting method of UE according to another embodiment of the present invention.

FIG. 4 is a diagram to describe a wireless access selecting method of UE according to another embodiment of the present invention.

In a step 1 shown in FIG. 4, a UE can transmit at least one platform or at least one OSID information, which can be supported by the UE, to an ANDSF. Alternatively, the UE can send a message for requesting an ISRP simply to the ANDSF.

In a step 2 shown in FIG. 4, an ANDSF server can provide the UE with a policy information (i.e., ISRP), which becomes a reference for determining a wireless access (e.g., WiFi, 3GPP, etc.) to be used for a data transmission by the UE, through a reference point S14. In this case, the ISRP can be determined in accordance with UE information provided to the ANDSF by the UE in the step 1 shown in FIG. 4 and an operator's policy and/or setting. And, the ISRP can include a combination of at least one of App-ID, OSId, OSVer, Platform and UE/MS Info, which are proposed by the present invention. For instance, App-ID category is included as an information for specifying an ISRP applied IPFlow. And, an OSId category is additionally included only if App-ID is included. Hence, it is able to indicate that an ISRP rule is applied to data (or flow) to which a specific application of a specific OS is related. In this case, the App-ID can be defined as a plurality of App-IDs for a plurality of OSIds if the UE informs the ANDSF of information indicating that a plurality of OSIds can be supported. In accordance with an operator's policy and/or setting, one App-ID can be selected from a plurality of App-IDs for a plurality of OSIds.

If the UE sends a message for requesting ISRP simply in the step 1 shown in FIG. 4, as mentioned in the foregoing description of the step 1 shown in FIG. 3, the ANDSF determines ISRP in consideration of App-ID, OSId and the like and is then able to provide the determined ISRP to the UE in a step 2 shown in FIG. 4.

Since operations in steps 3 to 5 shown in FIG. 4 are equivalent to the former operations in the steps 2 to 4 shown in FIG. 3, the redundant description shall be omitted from the following description.

The items mentioned in the former descriptions of the various embodiments of the present invention are independently applicable or at least two of the embodiments can be simultaneously applied.

Figure 5:
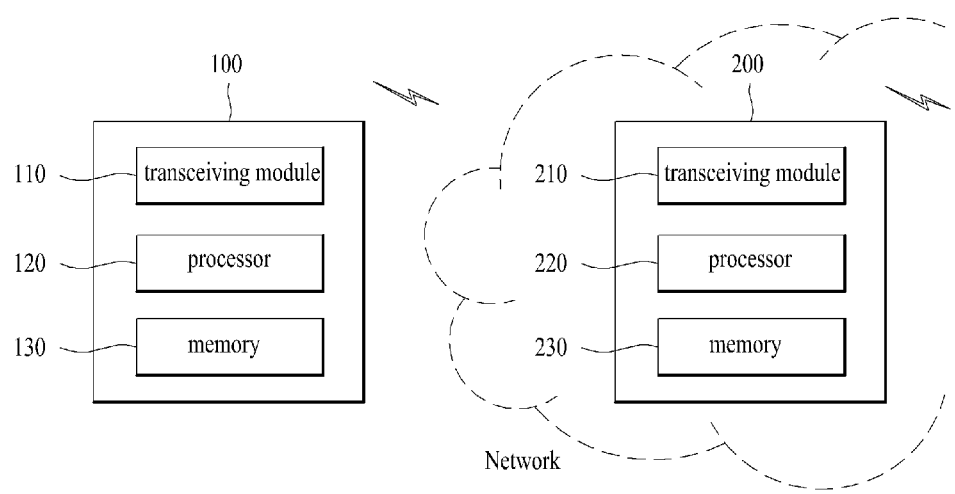
FIG. 5 is a diagram for one example of the configuration of a user equipment (UE) device and a network node device according to a preferred embodiment of the present invention.

FIG. 5 is a diagram for one example of the configuration of a user equipment (UE) device and a network node device according to a preferred embodiment of the present invention.

Referring to FIG. 5, a user equipment device 100 according to the present invention can include a transceiving module 110, a processor 120 and a memory 130. The transceiving module 110 can be configured to transmit various signals, data and informations to an external device and to receive various signals, data and informations from the external device. The user equipment device 100 can be connected to the external device by wire and/or wireless. The processor 120 can control overall operations of the user equipment device 100 and can be configured to perform a function of operating information and the like to be transceived with the external device by the user equipment device 100. The memory 130 can store the operated information and the like for prescribed duration and may be substituted with such a component as a buffer (not shown in the drawing) and the like.

The processor 120 of the user equipment device 100 can be configured to receive routing policy information from a network node device 200 using the transceiving module 110. The processor 120 can be configured to discriminate data based on the routing policy information, to select the wireless access per the discriminated data, and to transmit the discriminated data through the selected wireless access using the transceiving module 110. In this case, the routing policy information can include an application identification information for discrimination of the data and an OS (operating system) identification information.

Moreover, the processor 120 of the user equipment device 100 according to one embodiment of the present invention can be configured to perform various kinds of processing required for performing the operations of UE/MS explained in the foregoing descriptions of the various proposals and embodiments of the present invention.

Referring to FIG. 5, a network node device 200 according to the present invention can include a transceiving module 210, a processor 220 and a memory 230. The transceiving module 210 can be configured to transmit various signals, data and informations to an external device and to receive various signals, data and informations from the external device. The network node device 200 can be connected to the external device by wire and/or wireless. The processor 220 can control overall operations of the network node device 200 and can be configured to perform a function of operating information and the like to be transceived with the external device by the network node device 200. The memory 230 can store the operated information and the like for prescribed duration and may be substituted with such a component as a buffer (not shown in the drawing) and the like.

The processor 220 of the network node device 200 can be configured to determine the routing policy information including an application identification information for discrimination of the data for the user equipment device 100 and an OS (operating system) identification information. The processor 220 of the network node device 200 can be configured to transmit the routing policy information to the user equipment device 100 using the transceiving module 210. In this case, the data are discriminated by the user equipment based on the routing policy information and the wireless access is determined per the discriminated data. And, the determined wireless access can be used for transmission of the discriminated data.

Moreover, the processor 220 of the network node device 200 according to one embodiment of the present invention can be configured to perform various kinds of processing required for performing the operations of ANDSF explained in the foregoing descriptions of the various proposals and embodiments of the present invention.

The detailed configurations of the user equipment device 100 and the network node device 200 mentioned in the above description may be implemented in a manner that the matters of the various embodiments of the present invention mentioned in the foregoing description are independently applicable or that at least two of the various embodiments of the present invention are simultaneously applicable. And, duplicate contents may be omitted for clarity.

Embodiments of the present invention may be implemented using various means. For instance, embodiments of the present invention can be implemented using hardware, firmware, software and/or any combinations thereof In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein but intends to give a broadest scope matching the principles and new features disclosed herein.

INDUSTRIAL APPLICABILITY

The embodiments of the present invention mentioned in the foregoing description can apply to various kinds of mobile communication systems.

What is claimed is:

1. A method of selecting a wireless access in a user equipment of a wireless communication system, comprising:
transmitting first information including identifications of a plurality of operating systems supported by the user equipment;
receiving a routing policy information from a network node;
discriminating data based on the routing policy information and selecting the wireless access per the discriminated data; and
transmitting the discriminated data through the selected wireless access,
wherein the routing policy information includes an application identification information combined with operating system (OS) identification information for discrimination of the data, and
wherein a combination of the application identification information and the OS identification information specifies an inter-system routing policy (ISRP) rule applied to the data for a specific application of a specific OS among the plurality of operating systems.

2. The method of claim 1, wherein the application identification information and the OS identification information are defined as a sub-category of IPFlow in at least one of ForFlowBased category and ForNonSeamlessOffload category of the routing policy information.

3. The method of claim 1, further comprising the step of transmitting a message for requesting the routing policy information to the network node, wherein the routing policy information is provided in response to the request.

4. The method of claim 1, wherein the routing policy information further includes at least one of OS version information and platform information.

5. The method of claim 1, wherein the routing policy information is periodically provided to the user equipment.

6. The method of claim 1, wherein the routing policy information is determined based on at least one of an operator's policy and setting.

7. The method of claim 1, wherein the routing policy information comprises ISRP (inter-system routing policy).

8. The method of claim 1, wherein the network node comprises ANDSF (access network discovery and selection function).

9. The method of claim 1, wherein the wireless access comprises one selected from the group consisting of WiFi, Wimax, LTE (long term evolution), UMTS (universal mobile telecommunication system) and HSPA (high sped packet access).

10. A method of providing a routing policy information in a network node of a wireless communication system, comprising the steps of:
receiving first information including identifications of a plurality of operating systems supported by the user equipment;
determining the routing policy information including an application identification information combined with operating system (OS) identification information for discrimination of data for a user equipment based on the first information; and
transmitting the routing policy information to the user equipment,
wherein the data are discriminated in the user equipment based on the routing policy information,
wherein a wireless access is determined per the discriminated data,
wherein the determined wireless access is used for a transmission of the discriminated data, and
wherein a combination of the application identification information and the OS identification information specifies an inter-system routing policy (ISRP) rule applied to the data for a specific application of a specific OS among the plurality of operating systems.

11. A user equipment for selecting a wireless access in a wireless communication system, the user equipment comprising:
- a transceiver; and
- a processor configured to control the transceiver, wherein the processor is further configured to:
    - transmit first information including identifications of a plurality of operating systems supported by the user equipment,
    - receive a routing policy information from a network node,
    - discriminate data based on the routing policy information,
    - select the wireless access per the discriminated data, and
    - transmit the discriminated data through the selected wireless access using the transceiver,
    - wherein the routing policy information includes an application identification information combined with operating system (OS) identification information for discrimination of the data, and
    - wherein a combination of the application identification information and the OS identification information specifies an inter-system routing policy (ISRP) rule applied to the data for a specific application of a specific OS among the plurality of operating systems.

12. A network node for providing a routing policy information in a wireless communication system, the network node comprising:
- a transceiver; and
- a processor configured to control the transceiver, wherein the processor is further configured to:
    - receive first information including identifications of a plurality of operating systems supported by the user equipment,
    - determine the routing policy information including an application identification information combined with operating system (OS) identification information for discrimination of data for a user equipment,
    - transmit the routing policy information to the user equipment,
    - wherein the data are discriminated in the user equipment based on the routing policy information,
    - wherein a wireless access is determined per the discriminated data,
    - wherein the determined wireless access is used for a transmission of the discriminated data, and
    - wherein a combination of the application identification information and the OS identification information specifies an inter-system routing policy (ISRP) rule applied to the data for a specific application of a specific OS among the plurality of operating systems.

* * * * *